(12) United States Patent
Gordon

(10) Patent No.: US 9,634,981 B2
(45) Date of Patent: Apr. 25, 2017

(54) INTEGRATED EMAIL AND CHAT SYSTEM AND METHOD

(71) Applicant: TETRAPOD SOFTWARE INC., Seattle, WA (US)

(72) Inventor: Philip Stewart Gordon, Seattle, WA (US)

(73) Assignee: CHATBOX, INC., Seattle, WA (US)

( * ) Notice: Subject to any disclaimer, the term of this patent is extended or adjusted under 35 U.S.C. 154(b) by 112 days.

(21) Appl. No.: 14/722,243

(22) Filed: May 27, 2015

(65) Prior Publication Data

US 2016/0352677 A1   Dec. 1, 2016

(51) Int. Cl.
*G06F 15/16* (2006.01)
*H04L 12/58* (2006.01)

(52) U.S. Cl.
CPC .............. *H04L 51/36* (2013.01); *H04L 51/04* (2013.01)

(58) Field of Classification Search
CPC ................................ H04L 51/36; H04L 51/04
See application file for complete search history.

(56) References Cited

U.S. PATENT DOCUMENTS

| | | | | |
|---|---|---|---|---|
| 7,639,672 B2* | 12/2009 | Foote | ................. | H04L 12/1822 370/352 |
| 7,933,926 B2* | 4/2011 | Ebert | ................. | G06F 11/3428 702/182 |
| 8,725,810 B1* | 5/2014 | Bau | ........................ | H04L 51/04 709/204 |
| 2004/0260770 A1* | 12/2004 | Medlin | ................ | G06Q 10/107 709/204 |
| 2005/0154557 A1* | 7/2005 | Ebert | ................. | G06F 11/3447 702/182 |
| 2008/0019353 A1* | 1/2008 | Foote | ................. | H04L 12/1822 370/352 |
| 2009/0313550 A1* | 12/2009 | Kim | ....................... | G06F 17/30 715/744 |
| 2010/0205539 A1* | 8/2010 | Gestsson | .............. | G06Q 10/107 715/752 |
| 2015/0033149 A1* | 1/2015 | Kuchoor | ............... | G06F 17/241 715/753 |
| 2015/0256353 A1* | 9/2015 | Busey | ................ | H04L 12/1813 715/758 |
| 2016/0011845 A1* | 1/2016 | Kuchoor | ............... | G06F 17/241 715/753 |

* cited by examiner

*Primary Examiner* — Moustafa M Meky
(74) *Attorney, Agent, or Firm* — AEON Law; Adam L. K. Philipp

(57) ABSTRACT

The disclosed system and method seamlessly melds aspects of chat and email in one system. The disclosed system and method facilitates easy and frictionless real-time collaboration between Users, whether accessed via email, a web interface, or a chat client.

20 Claims, 13 Drawing Sheets

INTEGRATED EMAIL AND CHAT SYSTEM AND METHOD

BACKGROUND

Chat is a method of computer-aided communication wherein users send and receive electronic messages to each other in real-time. Software running on desktop computers or mobile devices facilitate chat, often in conjunction with a server computer. Chat users compose messages that can include content such as text, internet hyperlinks, pictures, files, and the like.

Chat software allows users to create and segment conversations by theme or subject, commonly referred to as a chat room. Chat rooms may have restricted membership. Typically, a chat room administrator (the chat room owner) is tasked with overseeing the membership list of a chat room, inviting and banning users as appropriate.

Some companies currently use chat software in order to facilitate collaboration between members of their company. In these embodiments, chat is typically restricted to members of the company. Some examples of intra-company chat software include HipChat, Slack, Yammer, and the like.

Chat software for tightly knit social groups (friends) is prevalent and widespread. Software such as Facebook Messenger, Skype, AIM, SnapChat, and WhatsApp are embodiments of social chat applications. SMS (Short Message Service) messages via mobile phone are another example of chat software used in this context.

One problem of existing chat software and of existing combinations of chat and email, is that the services require that users login to the chat system and/or that users setup chat rooms. For systems which combine email and chat, requiring user login is a significant impediment to adding new users, as new users may only have a transient relationship with the chat service and some of the new users may not want or be able to install a new piece of chat software. For some such existing combinations of chat and email, chat is the nucleus of the service; email can be used to join the chat service, but the email cannot be used to carry on an interactive conversation with others in the chat service.

BRIEF SUMMARY

The disclosed method and system enables easy, quick, frictionless setup of conversations which can take place in chat rooms and in email. Communication can take place among users through use of the chat room and through use of email. No login is required and use of a dedicated chat client is optional.

To initiate a conversation, an "Administrator" send an invitation email to Recipients and to the IECS Service 800. The IECS Service 800 obtains or assigns an Account ID to each email address in the email (including the Administrator and the Recipients) and creates a chat room to host the conversation (for those who access it via the web or via a chat client). The content of the invitation email is entered into the chat room content. The IECS Service 800 creates a Unique Hyperlink 308 and sends it to the Participants in a Link Email 700. The Unique Hyperlink 308 in the Link Email 700 is used to access the chat room. Participants in the conversation who do not access the chat room via a chat client are sent Digest Emails to keep them up-to-date regarding the conversation occurring in the chat room and Participants, whether or not they access the chat room, can contribute to the conversation via an email reply to the Link Email 700.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

The following description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein,"

"above," "below," and words of similar import, when used in this application, shall refer to this application as a whole and not to particular portions of this application. When the context permits, words in the above Detailed Description using the singular may also include the plural while words using the plural may also include the singular. The word "or," in reference to a list of two or more items, covers all of the following interpretations of the word: any of the items in the list, all of the items in the list, and any combination of one or more of the items in the list. In the following discussion, capitalized terms are defined herein.

Drawings

Figure 1:
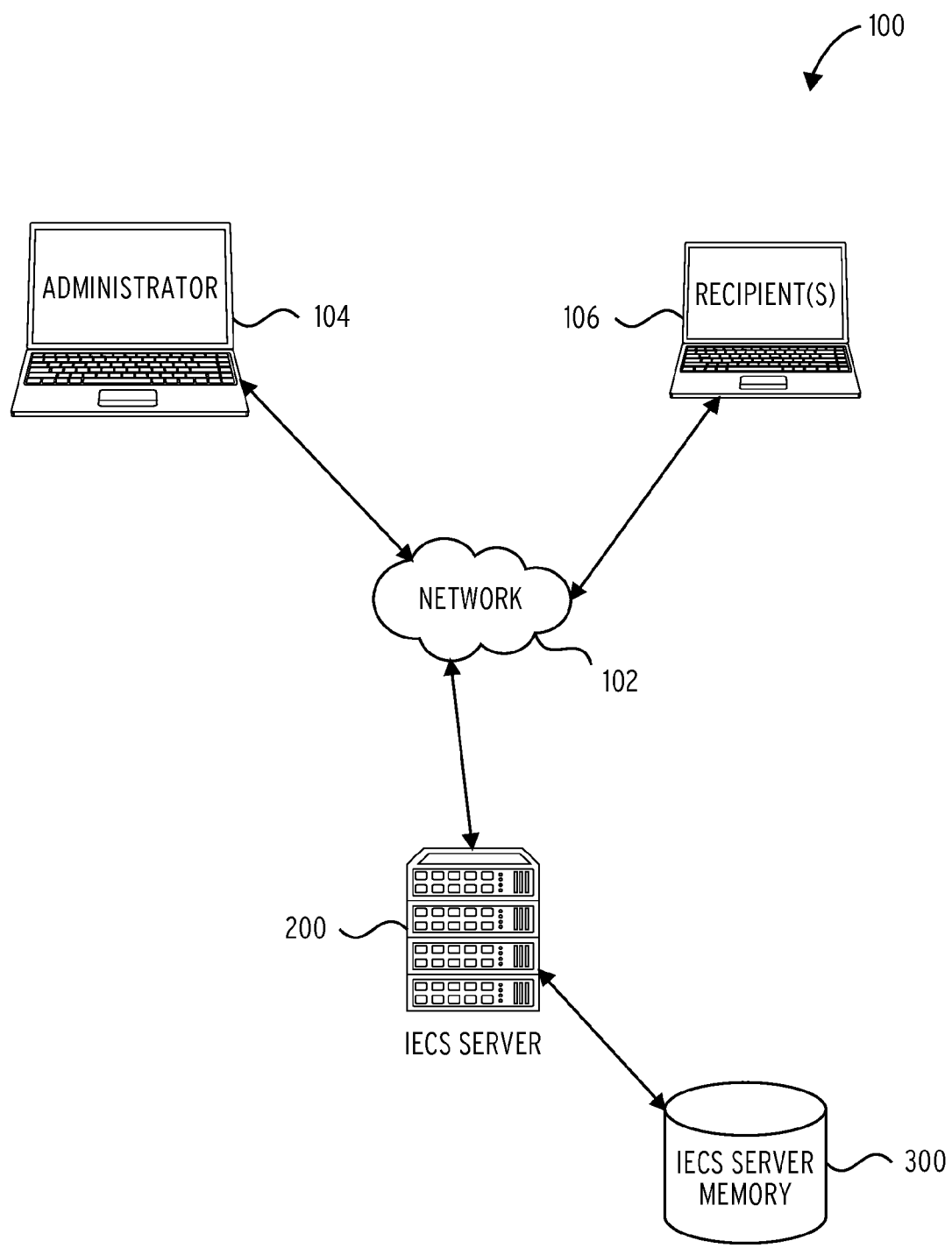
FIG. 1 is a Network and Device Diagram of computers configured according to an exemplary embodiment.

FIG. 1 is a network and device diagram illustrating exemplary computing devices configured according to embodiments disclosed in this paper. Illustrated in FIG. 1 is Administrator 104 who wishes to initiate a new chat room using the IECS Server 200. Recipient 106 is a User targeted by Administrator 104 for inclusion in a new collaborative chat room. For purposes of this paper, the term "User", participant or Participant 400 refers to both Administrator 104 and Recipient 106. Each of the computers illustrated in FIG. 1 represent potentially more than one computer and more than one person.

Participant 400 uses mobile and non-mobile computing devices, such as a mobile phone, a tablet, laptop, personal computer, gaming computer, or media playback computer. These devices are collectively referred to herein as a "Computer" or "Device" and represent any computing device capable of interacting with IECS Client 418 and IECS Server 200.

Administrator 104, Recipient 106, and IECS Server 200 in FIG. 1 execute Email Software, which may refer to standard email computer programs such as Apple Mail, Thunderbird, Gmail, Microsoft Mail, and the like. Email Software may be a standalone application or may be run as an application from within a web browser. Email Software typically provides functionality that allows users to read, compose, and store and retrieve email messages. Email messages may be comprised of text, links, photos, videos, documents, and other similar computer file attachments.

To start a chat session, Administrator 104 composes Invitation Email 500 to Recipient 106 and cc's Mail Service 1000 executed by IECS Server 200. Invitation Email 500 is routed across Network 102 to Mail Service 1000. Mail Service 1000 (executing Email Software) identifies Administrator 104, at least one Recipient 106 and any special instructions, referred to herein as Chat Room Parameters 310, in Invitation Email 500.

IECS Server 200 executes Create Link Routine 1002 (deleted) to create Unique Hyperlink 308 and composes and sends Link Email 700 to Email Software for both Administrator 104 and Recipient 106. Link Email 700 contains Unique Hyperlink 308 which, when clicked, opens IECS Client 418 and facilitates collaborative, real-time communication and chat. Link Email 700 and Unique Hyperlink 308 serve as the primary gateway to the IECS Client 418.

IECS Service 800 and Create Digest Routine 1004 (deleted) composes Digest Email 314 that contain unseen messages. These Digest Email 314 are sent to Email Software Email Software 408 for Administrator 104 and Recipient 106 when they have unseen messages on a schedule that may be configurable. In some embodiments, Digest Email 314 may also contain Unique Hyperlink 308 that serves as a link to open IECS Client 406.

IECS Client 406 is more fully described below and is the primary computer software that facilitates real-time collaboration and chat. IECS Client 406 may be a native application, software that runs in a web browser, or the like.

Users (104, 106) may compose Email Response (130) with Email Software 408. Email Responses (130) are routed to IECS Service 800 and processed, with contents being treated as chat messages and routed to all IECS Client 406 applications executed on User computers.

Interaction among devices illustrated in FIG. 1 may be accomplished, for example, through the use of credentials to authenticate and authorize a machine or user with respect to other machines.

Network 102 comprises computers, network connections among the computers, and software routines to enable communication between the computers over the network connections. Examples of Network 102 comprise an Ethernet network, the Internet, and/or a wireless network, such as a GSM, TDMA, CDMA, EDGE, HSPA, LTE or other network provided by a wireless service provider. Connection to Network 102 may be via a Wi-Fi connection. More than one network may be involved in a communication session between the illustrated devices. Connection to Network 102 may require that the computers execute software routines which enable, for example, the seven layers of the OSI model of computer networking or equivalent in a wireless phone network.

This paper may discuss a first computer as connecting to a second computer (such as Recipient 106 connecting to IECS Server 200) or to a corresponding datastore (such as to IECS Server Memory 300); it should be understood that such connections may be to, through, or via the other of the two components (for example, a statement that a computing device connects with or sends data to IECS Server 200 should be understood as saying that the computing device may connect with or send data to the IECS Server Memory 300). References herein to "database" should be understood as equivalent to "Datastore." Although illustrated as components integrated in one physical unit, the computers and databases may be provided by common (or separate) physical hardware and common (or separate) logic processors and memory components. Though discussed as occurring within one computing device, the software routines and data groups used by the software routines may be stored and/or executed remotely relative to any of the computers through, for example, application virtualization.

Figure 2:
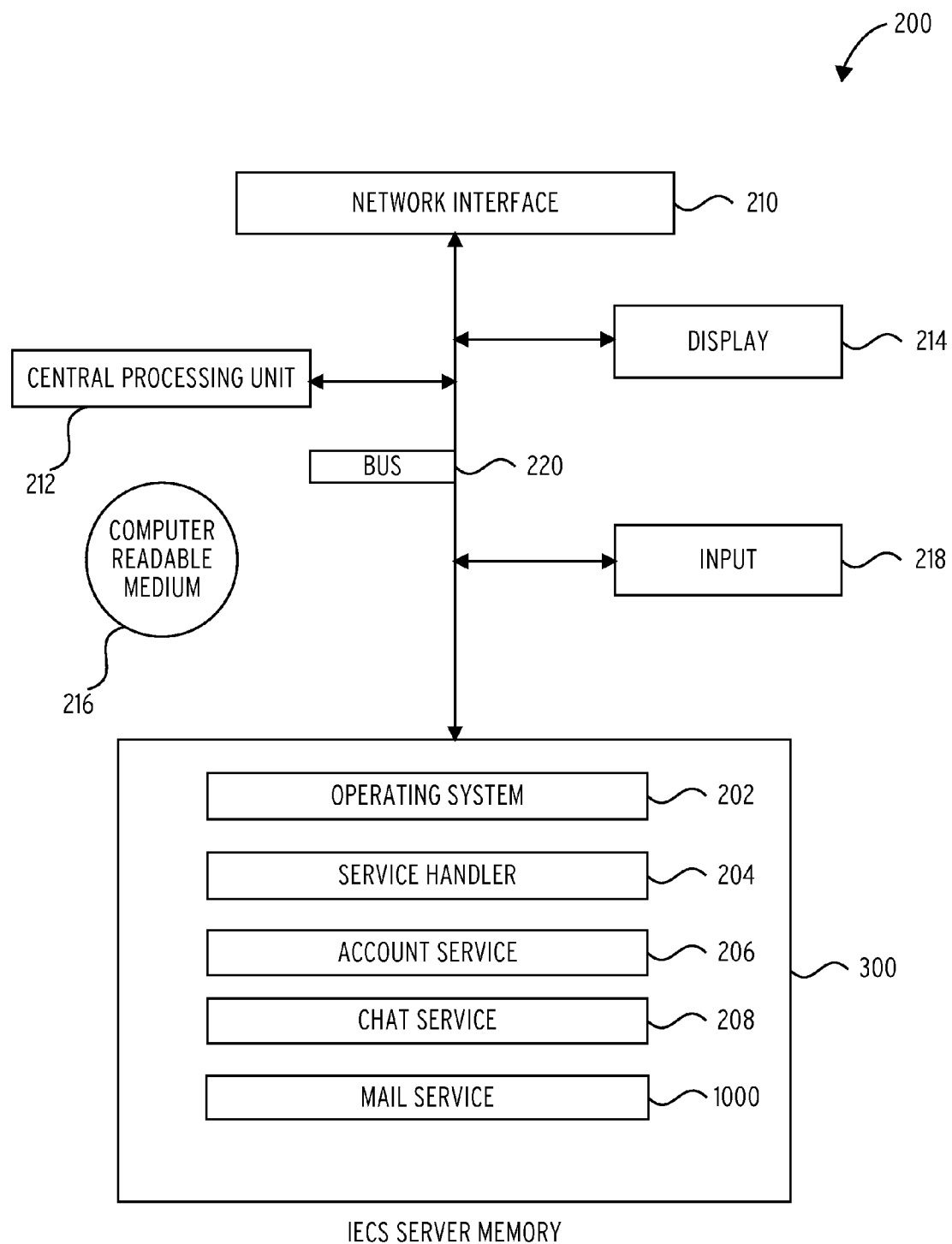
FIG. 2 is a block diagram of an exemplary IECS Server computing device and some data structures and/or components thereof.

FIG. 2 is a functional block diagram of an exemplary IECS Server 200 computing device and some data structures and/or components thereof. IECS Server 200 in FIG. 2 comprises at least one Central Processing Unit 212, IECS Server Memory 300, Display 214 and Input 218, all interconnected along with Network Interface 210 via Bus Bus 220. Central Processing Unit 212 may comprise one or more general-purpose Central Processing Units ("CPU") as well as one or more special-purpose Graphics Processing Units ("GPU"). The components of Central Processing Unit 212 may be utilized by Operating System 202 for different functions required by the routines executed by IECS Server 200. Network Interface 210 may be utilized to form connections with Network 102 or to form device-to-device connections with other computers. IECS Server Memory 300 generally comprises a random access memory ("RAM"), a read only memory ("ROM"), and a permanent mass storage device, such as a disk drive or SDRAM (synchronous dynamic random-access memory). IECS Server Memory 300 stores program code for software routines, such as, for example, Service Handler 204, Account Service 206, Chat Service 208, and Mail Service 1000 as well as, for example, browser, email client and server routines, client applications, and database applications (discussed further below). Additional data groups for routines, such as for a webserver and web browser, may also be present on and executed by IECS Server 200. Webserver and browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate user-interface and user-interface enabling routines generally, and may be replaced by equivalent routines for serving and rendering information to and in a user interface in a computing device (whether in a web browser or in, for example, a mobile device application).

In addition, IECS Server Memory 300 also stores Operating System 202. These software components may be loaded from a non-transient Computer Readable Medium 216 into IECS Server Memory 300 of the computing device using a drive mechanism (not shown) associated with non-transient Computer Readable Medium 216, such as a floppy disc, tape, DVD/CD-ROM drive, memory card, or other like storage medium. In some embodiments, software components may also or instead be loaded via a mechanism other than a drive mechanism and Computer Readable Medium 216 (e.g., via Network Interface 210).

IECS Server 200 may also comprise hardware supporting input modalities, Input 218, such as, for example, a touchscreen, a camera, a keyboard, a mouse, a trackball, a stylus, motion detectors, and a microphone. Input 218 may also serve as Display 214, as in the case of a touchscreen display which also serves as Input 218, and which may respond to input in the form of contact by a finger or stylus with the surface of Input 218.

Figure 3:
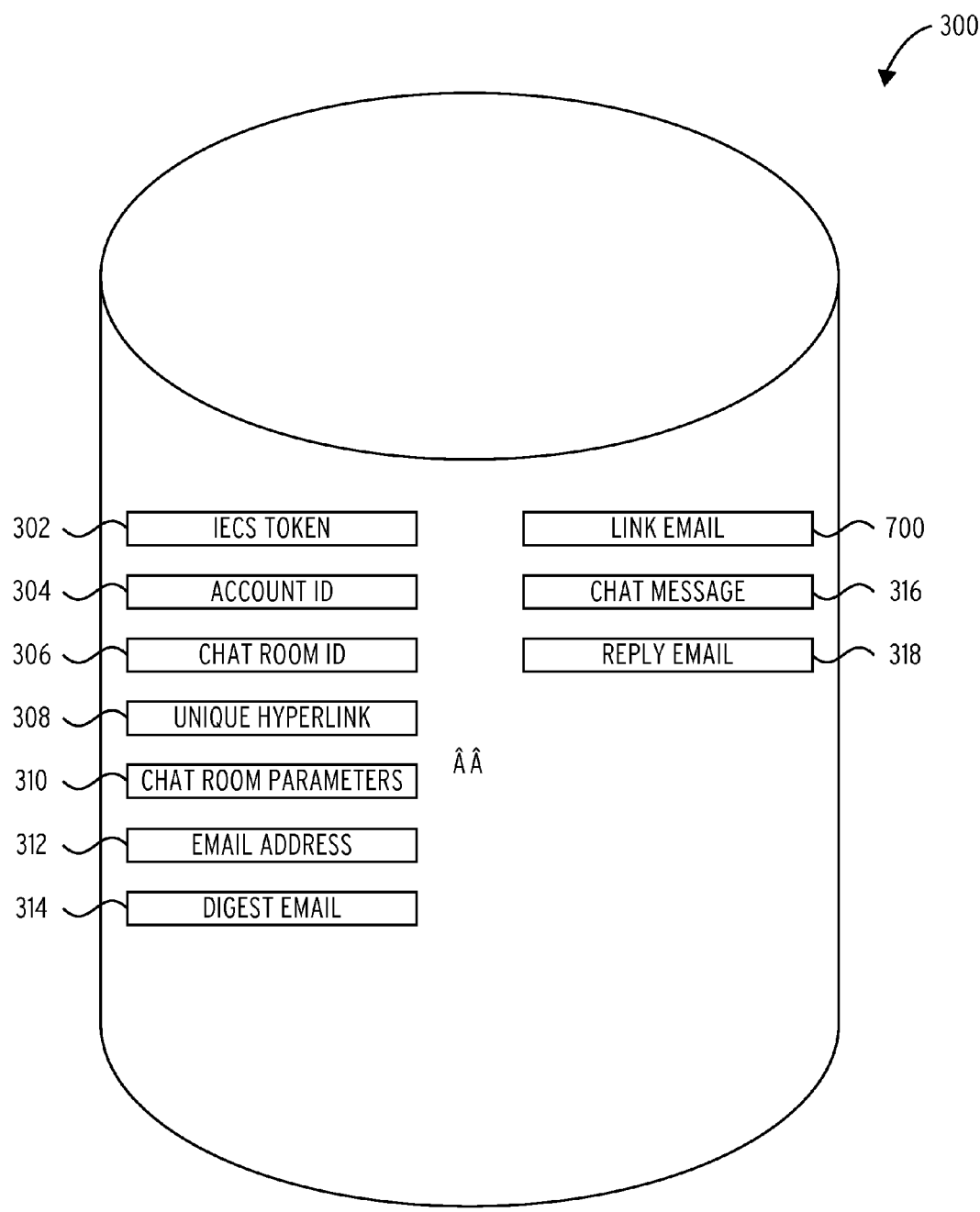
FIG. 3 is a functional block diagram of IECS Server Memory illustrated in the computing device of FIG. 2 and certain memory objects therein.

IECS Server 200 may also comprise or communicate via Bus 220 with IECS Server Memory 300, illustrated further in FIG. 3. In various embodiments, Bus 220 may comprise a storage area network ("SAN"), a high speed serial bus, and/or via other suitable communication technology. In some embodiments, IECS Server 200 may communicate with IECS Server Memory 300 via Network Interface Network Interface 210. IECS Server 200 may, in some embodiments, include many more components than those shown in this Figure. However, it is not necessary that all of these generally conventional components be shown in order to disclose an illustrative embodiment.

FIG. 3 is a functional block diagram of IECS Server Memory 300 illustrated in the computing device of FIG. 2. The components of IECS Server Memory 300 are data groups used by routines. The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar. The components of IECS Server Memory 300 are discussed further herein in the discussion of other of the Figures.

Figure 4:
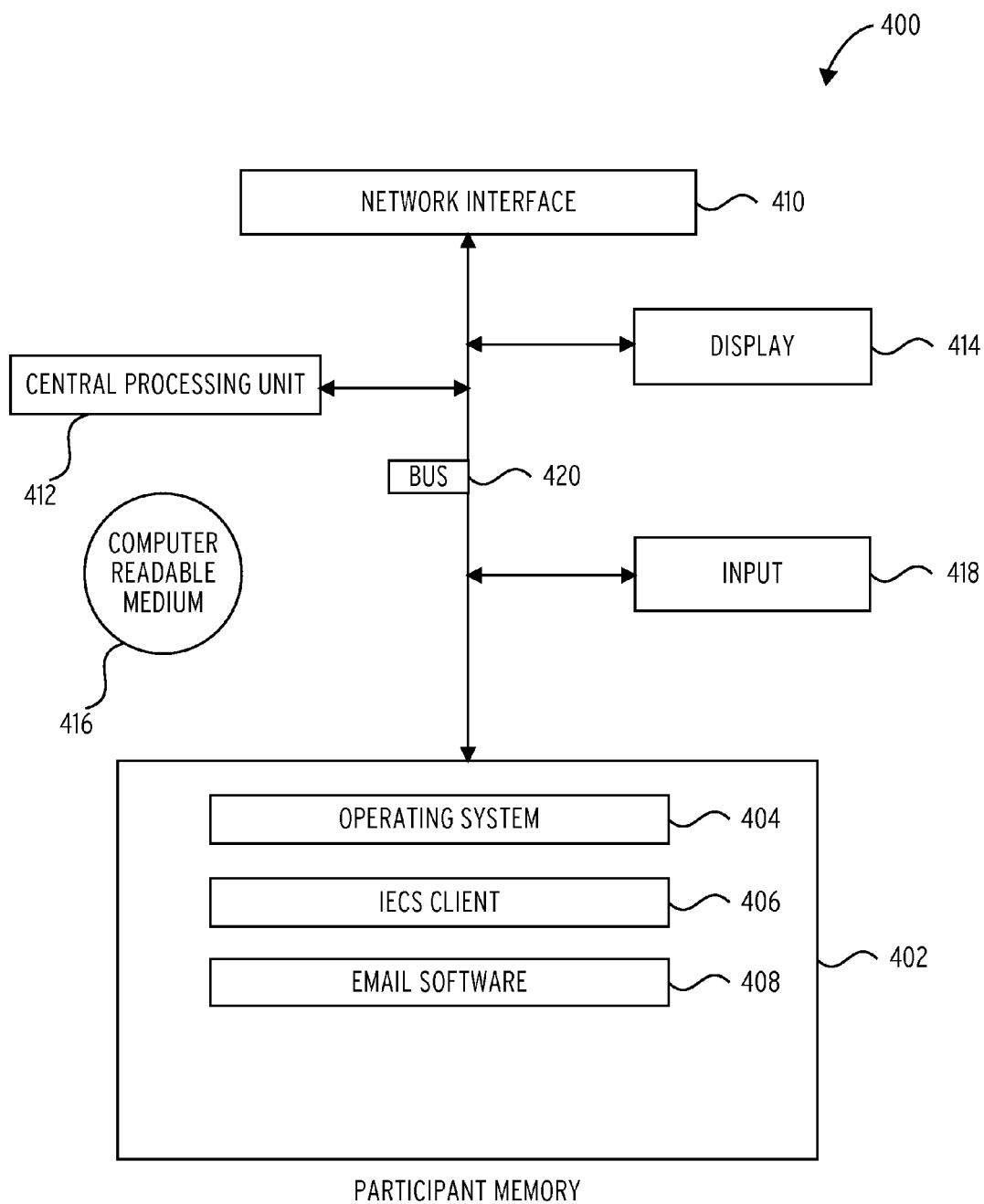
FIG. 4 is a functional block diagram of an exemplary participant computing device and some data structures and/or components thereof.

FIG. 4 is a functional block diagram of an exemplary Participant 400 computing device and some data structures and/or components thereof. Participant 400 in FIG. 4 comprises at least one Central Processing Unit 412, Participant Memory 402, Display 414 and Input 418, all interconnected along with Network Interface 410 via Bus 420. Central Processing Unit 412 may comprise one or more general-purpose Central Processing Units ("CPU") as well as one or more special-purpose Graphics Processing Units ("GPU"). The components of Central Processing Unit 412 may be utilized by Operating System 404 for different functions required by the routines executed by Participant 400. Network Interface 410 may be utilized to form connections with Network 102 or to form device-to-device connections with other computers. Participant Memory 402 generally comprises a random access memory ("RAM"), a read only memory ("ROM"), and a permanent mass storage device, such as a disk drive or SDRAM (synchronous dynamic random-access memory). Participant Memory 402 stores program code for software routines, such as, for example, IECS Client 406 and Email Software 408 as well as, for example, browser, email client and server routines, client applications, and database applications (discussed further below). Additional data groups for routines, such as for a webserver and web browser, may also be present on and executed by Participant 400. Webserver and browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate or describe user-interface and user-interface enabling routines generally, and may be replaced by equivalent routines for serving and rendering information to and in a user interface in a computing device (whether in a web browser or in, for example, a mobile device application).

In addition, Participant Memory 402 also stores Operating System 404. These software components may be loaded from a non-transient Computer Readable Medium 416 into Participant Memory 402 of the computing device using a drive mechanism (not shown) associated with non-transient Computer Readable Medium 416, such as a floppy disc, tape, DVD/CD-ROM drive, memory card, or other like storage medium. In some embodiments, software components may also or instead be loaded via a mechanism other than a drive mechanism and Computer Readable Medium 416 (e.g., via Network Interface 410).

Participant 400may also comprise hardware supporting input modalities, Input 418, such as, for example, a touchscreen, a camera, a keyboard, a mouse, a trackball, a stylus, motion detectors, and a microphone. Input 418 may also serve as Display 414, as in the case of a touchscreen display which also serves as Input 418, and which may respond to input in the form of contact by a finger or stylus with the surface of Input 418.

Participant 400 may also comprise or communicate via Bus 420 with Participant Memory 402. In various embodiments, Bus 420 may comprise a storage area network ("SAN"), a high speed serial bus, and/or via other suitable communication technology. In some embodiments, Participant 400may communicate with Participant Memory 402 via Network Interface 410. Participant 400 may, in some embodiments, include many more components than those shown in this Figure. However, it is not necessary that all of these generally conventional components be shown in order to disclose an illustrative embodiment.

Figure 5:
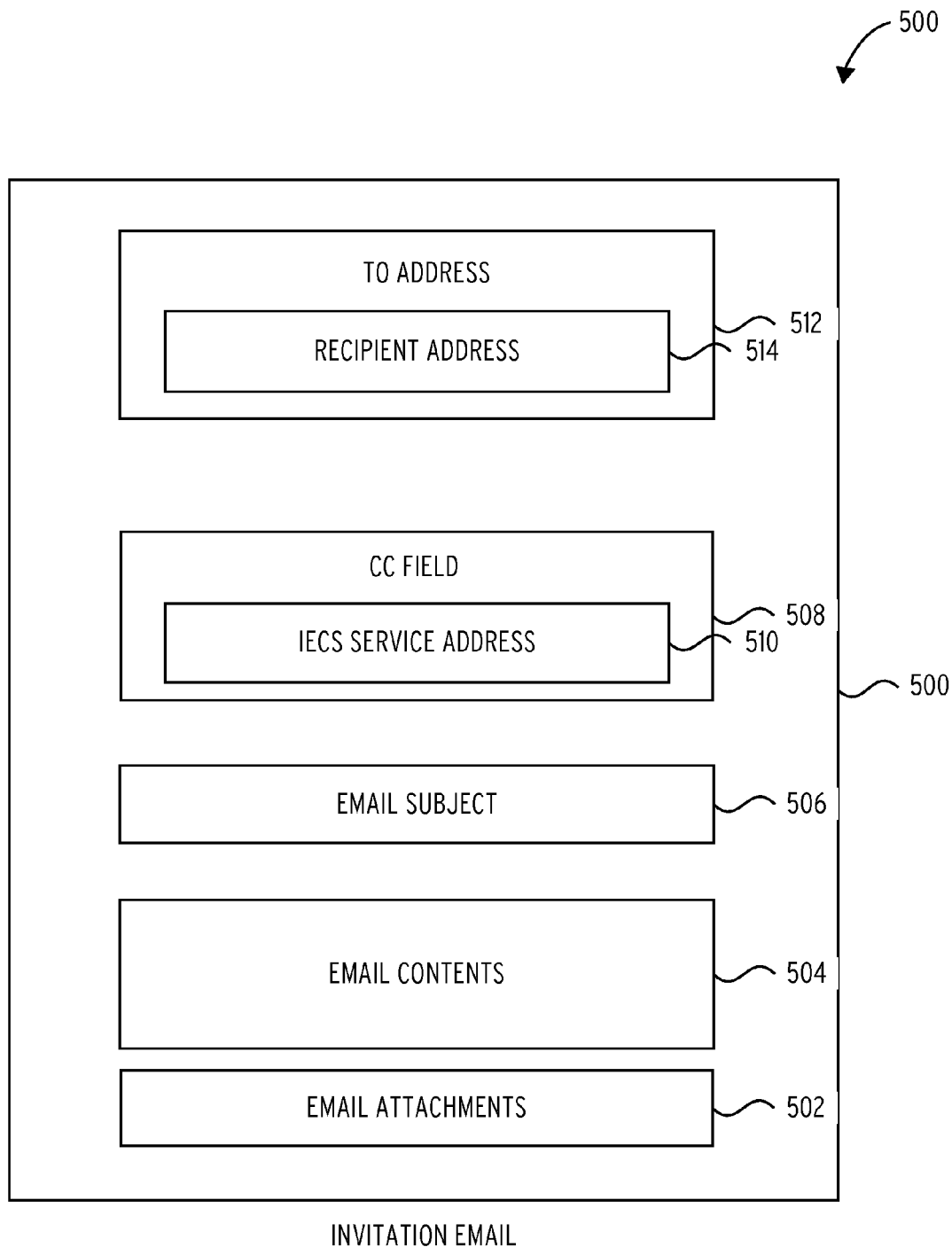
FIG. 5 illustrates an exemplary invitation email.

FIG. 5 is a diagram of an Invitation Email 500 composed by Administrator 104 with Email Software 408.

Administrator 104 may enter the email addresses associated with a list of one or more Recipient 106 into To Field

512. Recipient 106 is a User that Administrator 104 wishes to invite into Chat Room 606 (608, 610, 612, 614, 616, etc.).

Administrator 104 enters IECS Service Address 510 into CC Field CC Field 508 of Invitation Email 500. IECS Service Address 510 is an email address monitored by Mail Service 1000. By doing so, Administrator 104 routes Invitation Email 500 to IECS Mailbox 802.

Administrator 104 enters an Email Subject 506 for Invitation Email 500 Email Subject 506 may become Chat Room Subject 626 once Chat Room 606 has been created and is active.

Administrator 104 enters Email Contents 504 for Invitation Email 500. This provides context for the chat room and gives Participants (104, 106) information or a discussion topic for which the chat room has been created. Email Contents 504 may be sent as a Chat Message 316 to Chat Room 606 after it is created.

Administrator 104 may attach any Email Attachments 502 to Invitation Email 500. These may be files, photos, videos, or other computer files. These Email Attachments 502 may be sent as Chat Message 316 to the Chat Room 606 after it is created.

Figure 6:
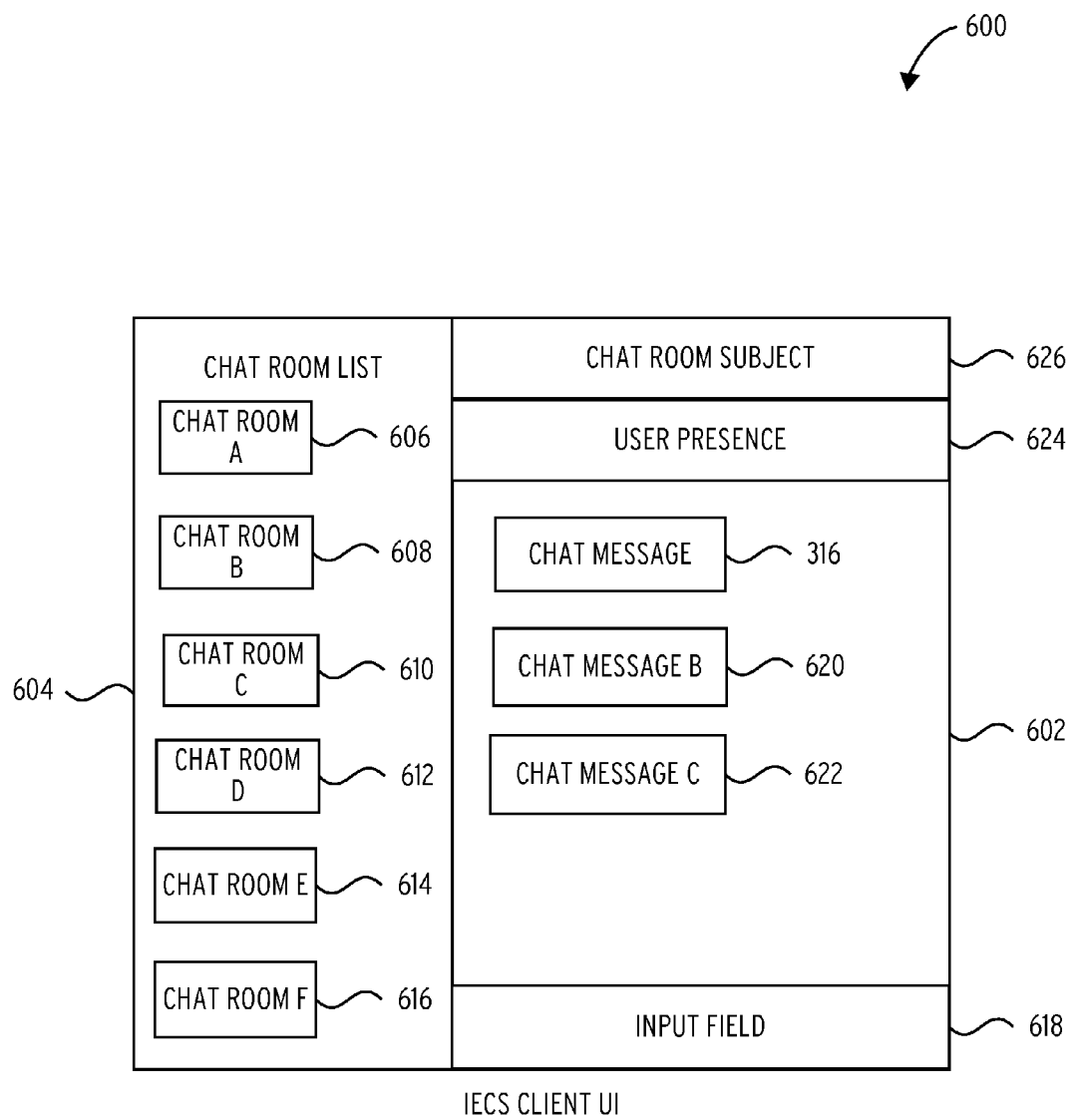
FIG. 6 illustrates an exemplary IECS Client UI.

FIG. 6 is a diagram of IESC IECS Client UI 600, the primary way for a User (104, 106) to interact with IECS Service 800. IECS Client IECS Client UI 600 may be native applications, software running inside an internet browser, or the like.

Chat Room List 604 presents a list of Chat Rooms (606-616). As an example, Chat Room 606 was created by IECS Service 800 at the request of Administrator 104 via the creation and processing of Invitation Email 500.

Chat Room Subject 626 is the subject of the currently active chat room, for example, Chat Room 606.

User Presence 624 may indicate which Users (104, 106) are active, inactive, connected, or disconnected within IECS Service 800.

Message List 602 contains Chat Message 316 (620, 622, etc) that were composed and distributed by Users (104, 106).

Chat Message 316 may be created in Input Field 618. Chat Message 316 may also have been created in response to an incoming email message processed by Mail Service 1000. Chat Message 316 may be composed by other means including by automated API, integration with third-party software packages, SMS, and the like. Chat Message 316 may comprise text, links, photos, files, or the like.

Figure 7:
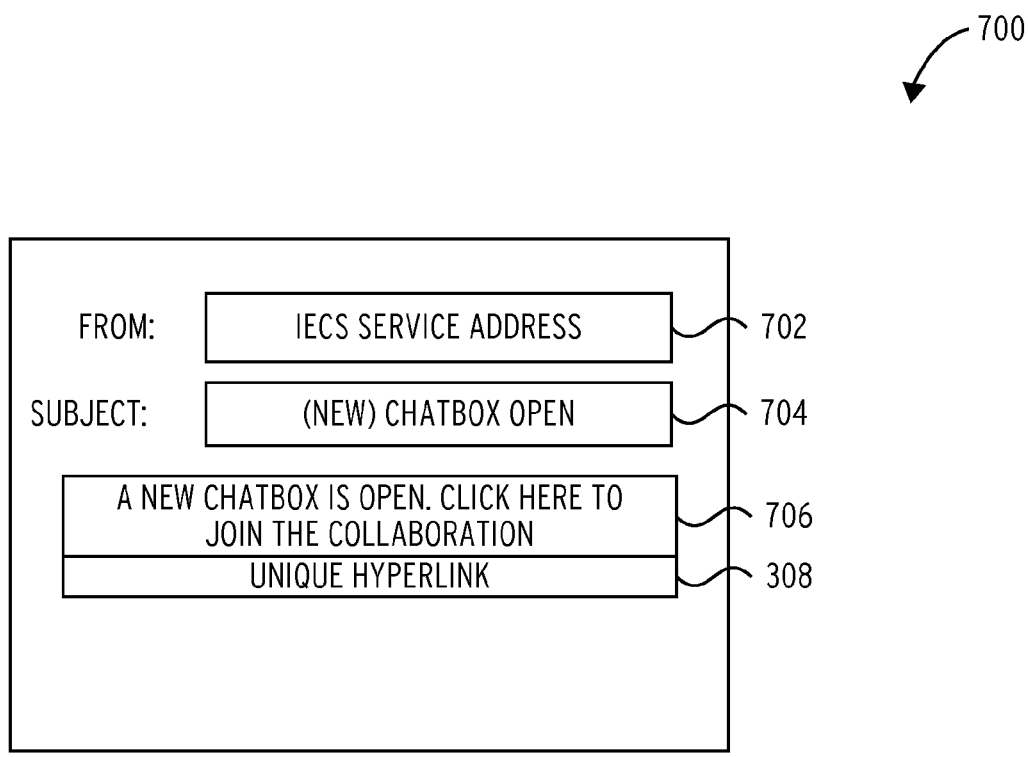
FIG. 7 illustrates an exemplary link email.

FIG. 7 shows a diagram of an embodiment of Link Email 700. Link Email 700 is an email that may be sent from Mail Service 1000 and that includes Unique Hyperlink 308.

As discussed further in relation to Create Link Routine 1002 (deleted), Unique Hyperlink 308 encodes identifiers of one or more Participants (104, 106, etc.) as well as a Chat Room ID 306, which may be used to identify a chat room, such as Chat Room 606. Unique Hyperlink 308 may be encrypted and encoded. IECS Service 800 may decompose Unique Hyperlink 308 and use the information obtained therefrom to open IECS Client 406, log in the associated participant (104, 106, etc.), and open the associated chat room.

Figure 8:
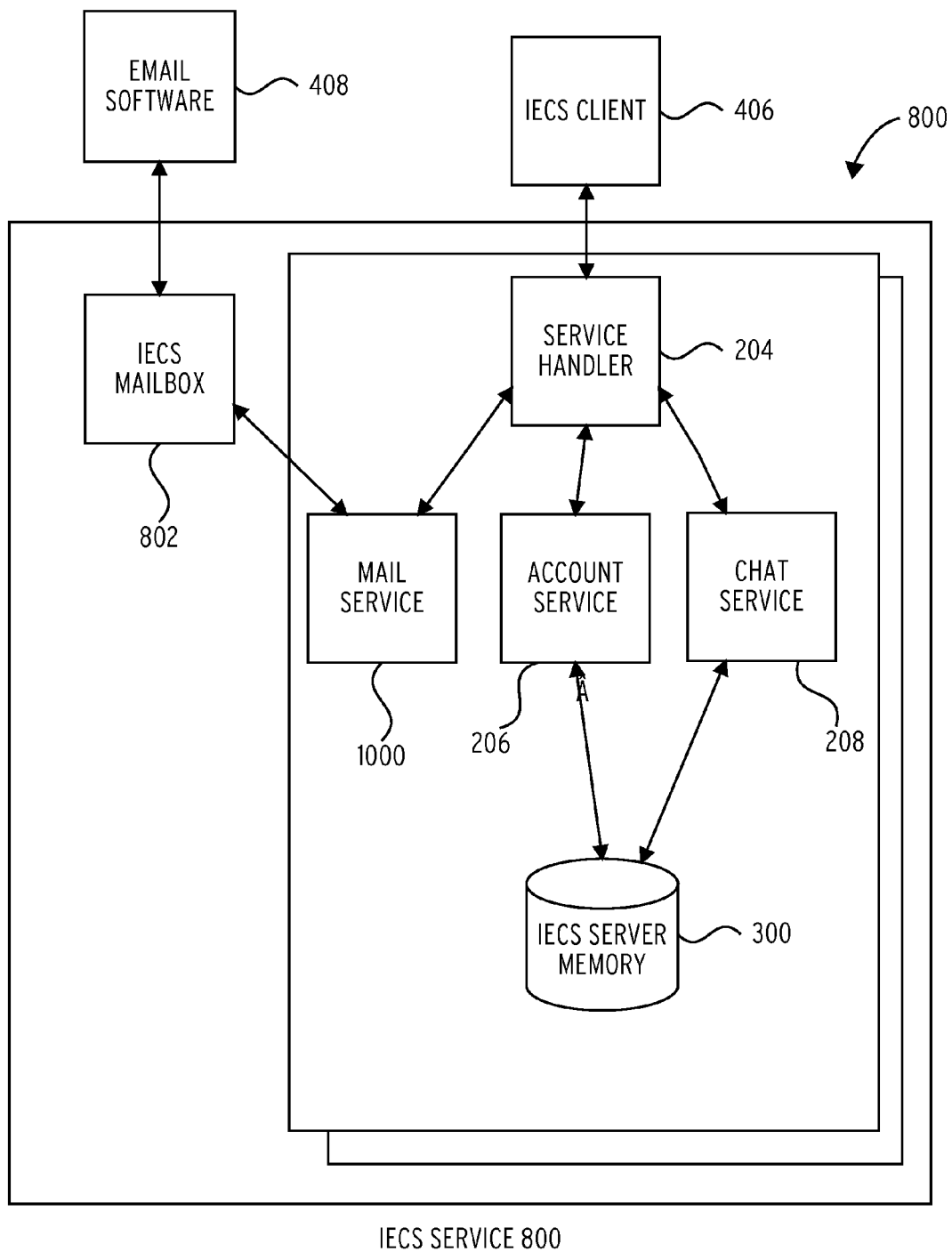
FIG. 8 illustrates examplary logical components in IECS Service and selected external components communicating with IECS Service.

FIG. 8 illustrates the IECS Service 800, provided by a collection of computers, servers, and software routines more fully described herein. IECS Service 800 provides functions required to create, administer, delete, and interact with Chat Rooms created with the IECS Service 800.

In FIG. 8, the computing machines may be physically separate computing devices or logically separate processes executed by a common computing device. Certain components are illustrated in FIG. 8 as connecting directly to one another, though the connections may be through any standard inter-computer communication protocol. If these components are embodied in separate computers, then additional steps may be added to the disclosed invention to facilitate communicating between the components.

IECS Mailbox 802 may be storage associated with email addresses associated with the IECS Service 800. Email composed by Users (such as Administrator 104 and Recipient 106) can be sent to IECS Mailbox 802. Mail Service 1000 monitors IECS Mailbox 802 for incoming messages, described further below.

Service Handler 204 may serve as the primary gateway and message router to the IECS Service 800. IECS Client 406 connects to Service Handler 204 to send and receive requests and messages through this service. Service Handler 204 may be responsible for marshaling those requests to the various other services in the IECS architecture, namely Mail Service 1000, Account Service 206, Chat Service 208, and IECS Server Memory 300.

Mail Service 1000 and Chat Service 208 may compose and send email to Email Software 408 for Users. Digest Email 314 and Link Email 700 are examples of email that these services may send.

Account Service 206 is responsible for account management, including personal identifying information for Users. Some examples of personal identifying information include name, password, nick name, email address, and user preferences for IECS Client 406.

Chat Service 208 is responsible for all chat related activities within the IECS Service 800, including the distribution of Chat Message 316 (622, 624, etc.) to IECS Client 406. Chat Service 208 is also responsible for monitoring and reporting User Presence 626, creation and deletion of Chat Room 606 (608-616, etc.).

IECS Server Memory 300 is a typical database and is used to store attributes for Accounts, Chat Rooms, Chat Sessions, Messages, Files, and other items of the like. IECS Server Memory 300 is discussed herein.

IECS Service 800 and components can be single processes or multiple processes and may exist on one or more computers simultaneously. Communication between components of IECS Service 800 can either be accomplished through internal shared memory, though internet connection, or through other similar process-to-process communication mechanisms.

Figure 9:
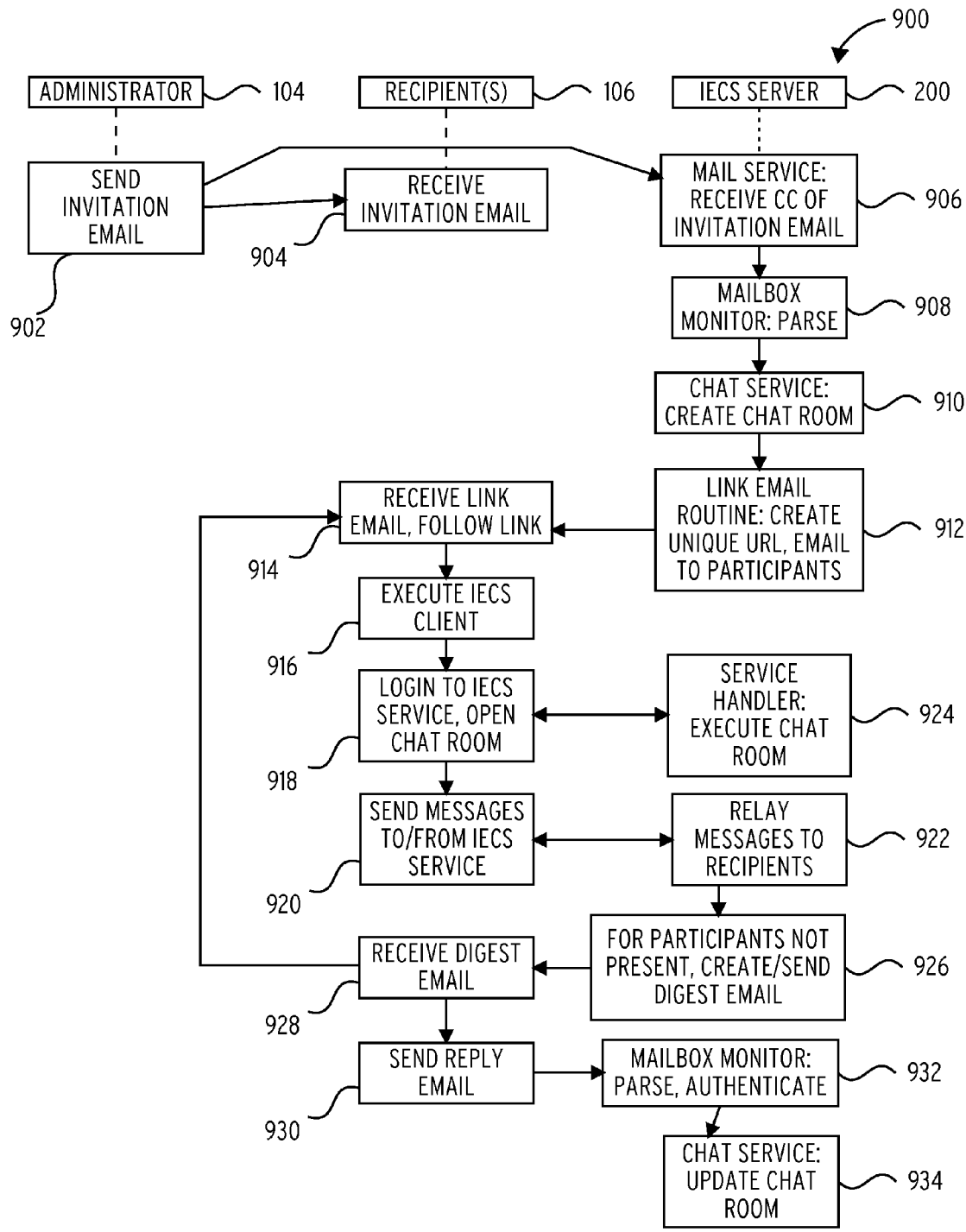
FIG. 9 illustrates exemplary messages passed between Administrator, Recipients, and IECS Server.
Figure 10:
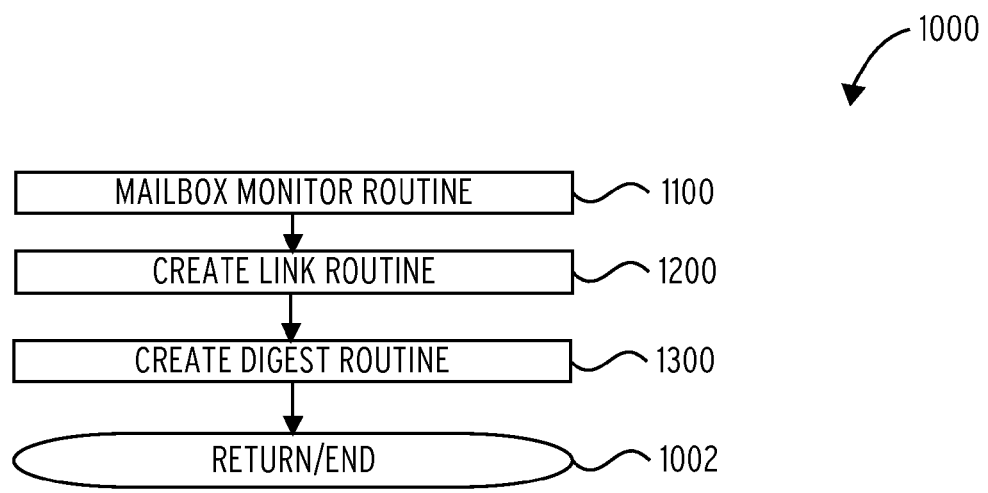
FIG. 10 illustrates an embodiment of Mail Service routine.

FIG. 9 does not describe all messages which may be exchanged between Administrator 104, Recipient 106, and IECS Server 200.

At block 902, Administrator 104 sends an Invitation Email 500 to Recipient 106 and cc's IECS Service address 702. At block 904, the Invitation Email 500 is received by Recipient 106. At block 906, IECS Service 800, IECS Mailbox 802 and Mailbox Monitor Routine 1100 receives the Invitation Email 500.

Figure 11:
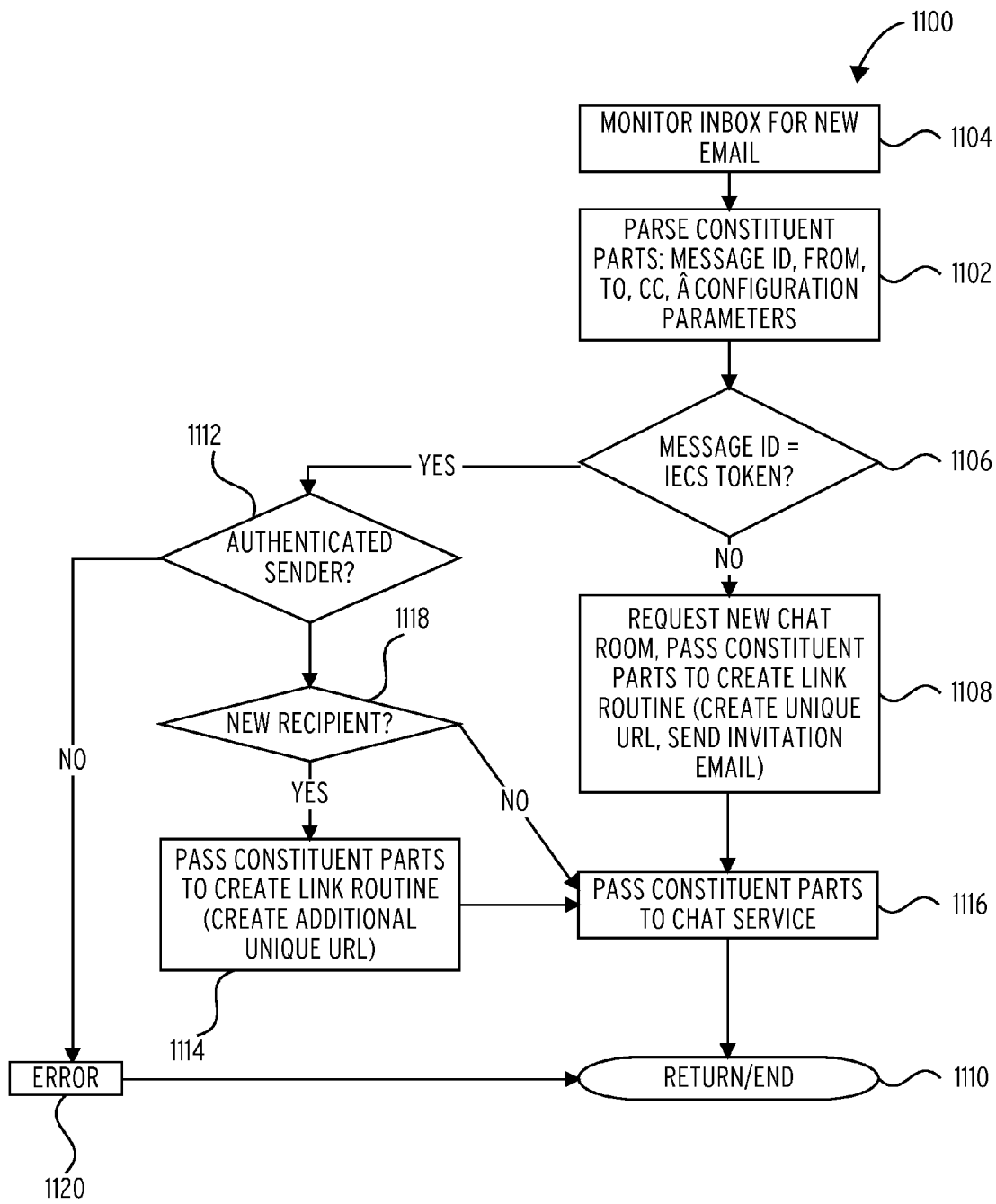
FIG. 11 illustrates an embodiment of Mailbox Monitor Routine.
Figure 12:
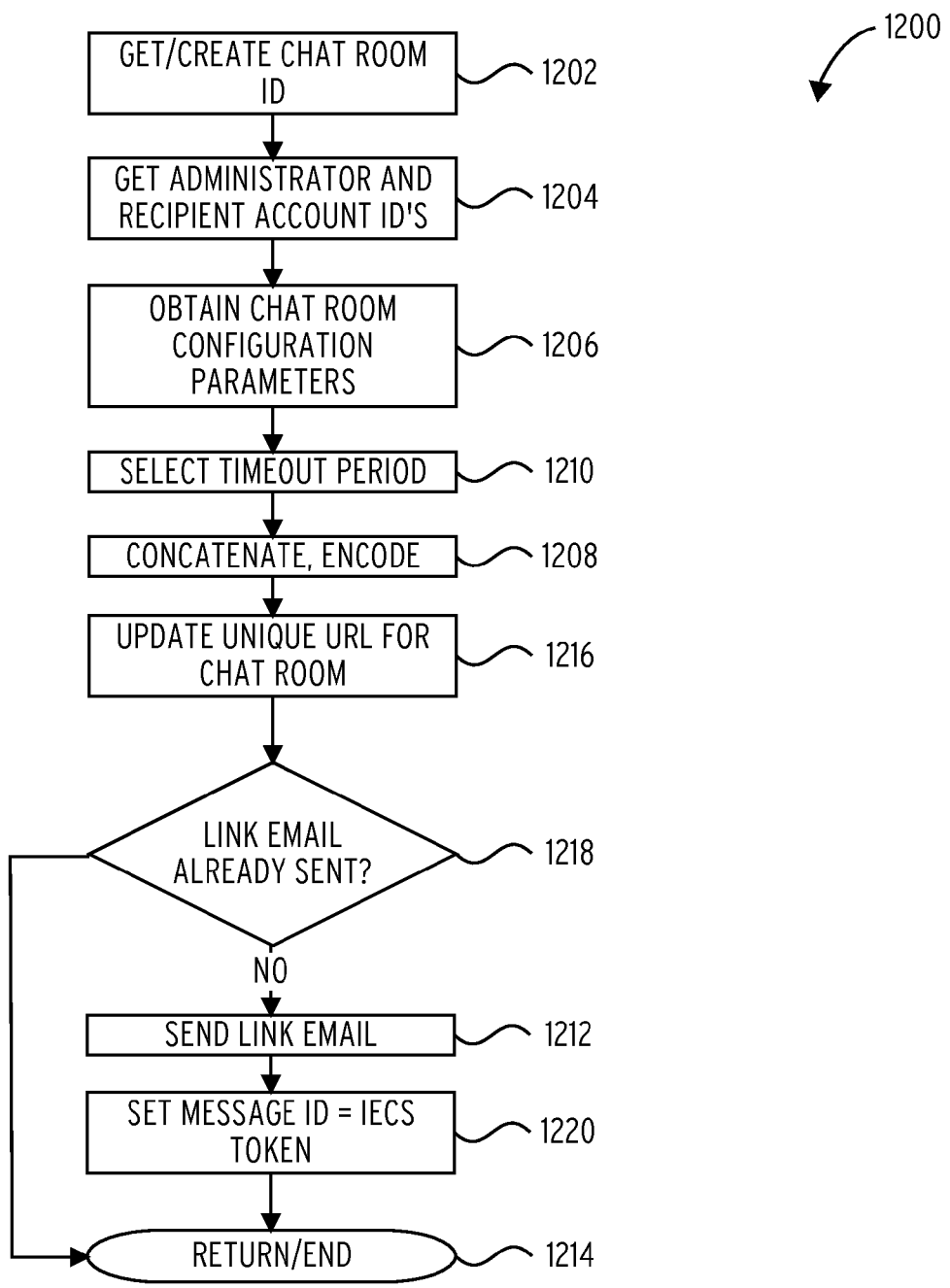
FIG. 12 illustrates an embodiment of Create Link Routine.
Figure 13:
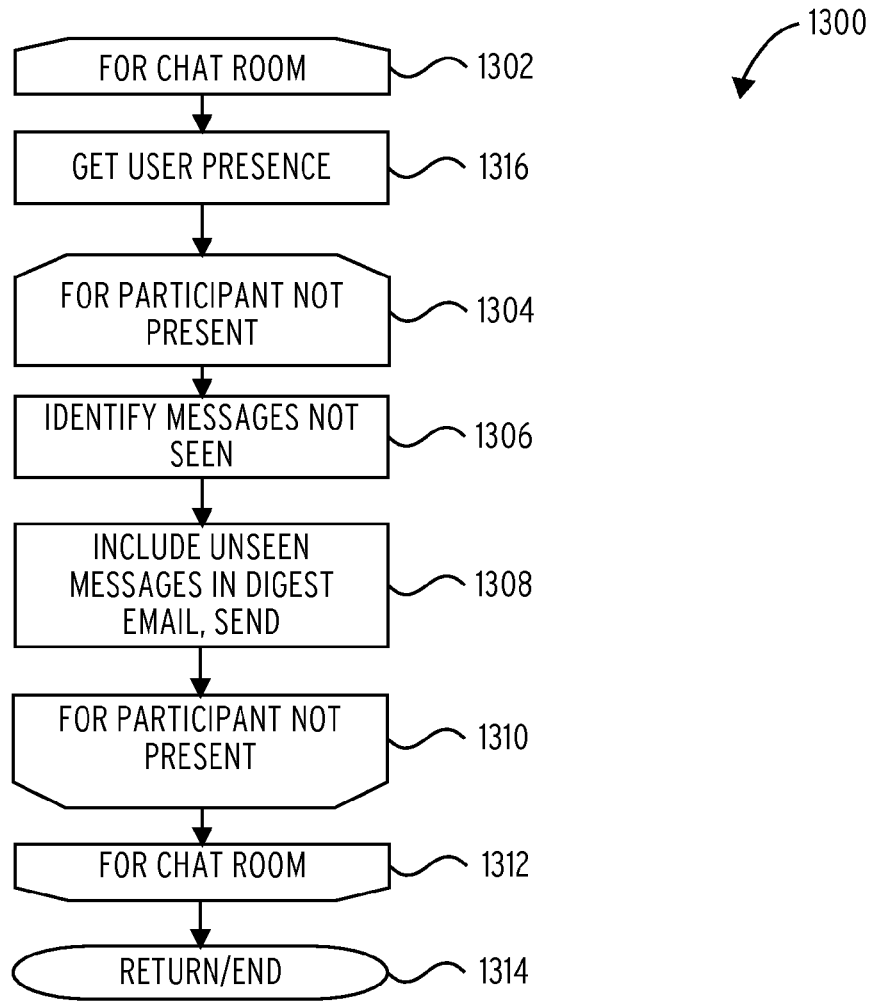
FIG. 13 illustrates an embodiment of Create Digest Routine.

At block 908, Mailbox Monitor Routine 1100 parses the components of Invitation Email 500, described further in FIG. 11, obtaining the set of participants in the chat room (comprising the Administrator 104 and the one or more Recipient 106), the Email Subject 506, the Email Contents 504, and the Email Attachments 502 (if any).

At block 910, Chat Service 208 is instructed by IECS Service 800 to create a Chat Room, as described in relation to FIG. 8.

At block 912, IECS Service 800 instructs Create Link Routine 1200 to create a Unique Hyperlink 308 for the created Chat Room and to email a Link Email 700 comprising the Unique Hyperlink 308 to the one or more Participants identified in the Invitation Email 500.

At block 914, Recipient 106 receives the Link Email 700 and clicks on or follows the URL comprising the Unique Hyperlink 308. At block 916, clicking on the URL causes Recipient 106 to execute IECS Client 406. At block 918, IECS Client 406 logs in to IECS Service 800 and opens the Chat Room. At block 920, IECS Client 406 sends messages to and from IECS Service 800, such as to create Chat Messages via entry of text in Input Field 618, via upload of photos, videos, and the like.

At block 924, Service Handler 204 receives the login from Recipient 106 and executes the chat room. At block 922, IECS Service 800 relays Chat Messages to Participants.

At block 926, IECS Service 800 is executing Create Digest Routine 1300, determines that one or more of the Participants are not present (according to User Presence 624, described further in relation to FIG. 6), and creates and sends Digest Email 314 to the not-present Participant(s).

At block 928, Recipient 106 receives the Digest Email 314 of block 926 and, at block 930, may send a Reply Email 318. Reply Email 318 may be a reply to Digest Email 314 or to Link Email 700.

At block 932, the Reply Email 318 is parsed and is authenticated as a Reply Email 318 when it is determined to contain IECS Token 302 (which generally may be the Message ID from the originating Link Email 700), and when it is received by IECS Mailbox 802 from a Participant in the corresponding Chat Room.

At block 934, Chat Service 208 updates the Chat Room with components parsed from Reply Email 318, such as with a Chat Message derived from the Email Contents 504 of Reply Email 318, from an Email Attachments 502, and teh like.

At block 1100, Mail Service 1000 routine executes Mailbox Monitor Routine 1100.

At block 1200, Mail Service 1000 routine executes Create Link Routine 1200.

At block 1300, Mail Service 1000 routine executes Create Digest Routine 1300.

At block 1002, Mail Service 1000 concludes or returns to a process which spawned it.

At block 1104, Mailbox Monitor Routine 1100 monitors IECS Mailbox 802 for new email and receives a new email.

At block 1102, Mailbox Monitor Routine 1100 parses the new email for its constituent parts, such as the Message ID in the email header, the From Field, To Field 512, and CC Field 508 (also in the email header), Email Subject 506, Email Contents 504, Email Attachments 502, and any Chat Room Parameters 310 (which may be special codes embedded or included in the email).

At block 1106, Mailbox Monitor Routine 1100 determines whether the Message ID in the new email is an IECS Token 302. If it is, then at block 1112, Mailbox Monitor Routine 1100 determines whether the sender of the email was a Participant in the Chat Room associated with the IECS Token 302 (whether the sender is authenticated). If affirmative at block 1112, then at block 1114, Mailbox Monitor Routine 1100 determines whether the new mail comprises a new Recipient 106, such as an email address in a To or CC Field, which email address is not already associated with an Account ID 304.

If affirmative at block 1114, then at block 1116, Mailbox Monitor Routine 1100 passes the constituent parts of the email to Create Link Routine 1200 to create an additional Unique Hyperlink 308 to associate with the Chat Room associated with the IECS Token 302.

At block 1110, Mailbox Monitor Routine 1100 passes the constituent parts of the email to Chat Service 208, where the Email Contents 504 and Email Attachments 502 may be converted into Chat Messages and where Chat Room Parameters 310 may be acted upon (such as to remove a Participant from the Chat Room and the like).

At block 1108, Mailbox Monitor Routine 1100 had determined at block 1106 that the Message ID was not an IECS Token 302, and requests a new Chat Room and passes the constituent parts of the email to Create Link Routine 1200 (to create a Unique Hyperlink 308 and to send an Invitation Email 500). Block 1108 may proceed to block 1110, discussed above.

At block 1118, Mailbox Monitor Routine 1100 may determine that an error has occurred and may ignore the new email and/or may transmit an error message.

At block 1120, Mailbox Monitor Routine 1100 may conclude or may return to another process which may have spawned Mailbox Monitor Routine 1100.

At block 1202, Create Link Routine 1200 gets (in the case of an updated Unique Hyperlink 308 which is being created for an existing Chat Room) or creates Chat Room ID 306 for the chat room.

At block 1204, Create Link Routine 1200 gets the Account ID 304 for Administrator 104 and Recipient 106, such as according to an association between an email address and Account ID 304. if an Administrator 104 or Recipient 106 does not yet have an Account ID, then one may be created at this block 902.

At block 1206, Create Link Routine 1200 obtains Chat Room Parameters 310, if any, in the constituent parts of the email.

At block 1208, Create Link Routine 1200 selects a timeout period, which may be a period for which Unique Hyperlink 308 is to remain valid for.

At block 1210, Create Link Routine 1200 may concatenate and encode the Account IDs and Chat Room IDs obtained in the preceding blocks, such as using HMAC SHA1 encryption and encoding scheme or the like.

At block 1212, Create Link Routine 1200 may update the valid Unique Hyperlinks associated with the Chat Room. This may involve adding a newly created Unique Hyperlink to a list of valid Unique Hyperlinks associated with the Chat Room or it may involve depricating a previous Unique Hyperlink associated with the Chat Room before the expiration of the timeout period of such previous Unique Hyperlink.

At block 1214, Create Link Routine 1200 determines whether a Link Email 700 comprising the Unique Hyperlink 308 has been sent or whether a new Link Email 700 is required to be sent.

At block 1216, if no Link Email 700 has been sent already (or if a new Link Email 700 is required to be sent), then Create Link Routine 1200 may create and send Link Email 700.

At block 1218, Create Link Routine 1200 obtains the Message ID of the sent Link Email 700 and sets it to be the IECS Token 302 for the Chat Room. Alternatively, Create Link Routine 1200 may set the value of the Message ID of Link Email 700 to be equal to IECS Token 302 prior to sending Link Email 700.

At block 1220, Create Link Routine 1200 may conclude or return to a process which spawned Create Link Routine 1200.

Blocks 1302 to 1314 of Create Digest Routine 1300 iterate over each Chat Room 606 (et al) monitored by Create Digest Routine 1300.

At block 1304, Create Digest Routine 1300 obtains User Presence 624. User Presence 624 may record, for example, that Participant 400 has been transmitted Chat Message 316 (620, et al), either via IECS Client 406 or in a Digest Email 314.

Blocks 1306 to 1312 iterate over each Participant 400 who has not been present (who has not been transmitted a Chat Message).

At block 1308, Create Digest Routine 1300 identifies the Chat Message(s) which have not been seen. This may be performed for batches or for periods of time.

At block 1310, Create Digest Routine 1300 includes the unseen Chat Message(s) in a Digest Email 314. The Message ID of the Digest Email 314 may be set to be the IECS Token 302 for the Chat Room and a current Unique Hyperlink 308 may be included in the Digest Email 314. The Digest Email 314 may then be sent to Participant 400.

At block 1316, Create Digest Routine 1300 may conclude or return to a process which spawned Created Create Digest Routine 1300.

The above Detailed Description is not intended to be exhaustive or to limit the combined chat and email service to the precise form disclosed above. While specific embodiments of, and examples for, the combined chat and email service are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

What is claimed is:

1. A method of integrating email and chat communications executed on a computer comprising a memory and a processor, which method comprises the following steps:
   receiving an invitation email;
   parsing a set of components from the invitation email, which set of components comprises a sender of the invitation email, a set of recipients of the invitation email, an invitation email subject, and an invitation email content;
   creating a chat room and obtaining a chat room identifier for the chat room;
   populating the chat room with a chat room subject comprising the invitation email subject and a chat room message comprising the invitation email content;
   obtaining an account identifier for each participant in a set of participants in the chat room, which set of participants in the chat room comprises a recipient of the invitation email in the set of recipients of the invitation email;
   creating a unique uniform resource locator comprising an encoded combination of the chat room identifier and the account identifier for each participant in the set of participants in the chat room;
   including the unique uniform resource locator in a link email;
   transmitting the link email to the set of participants in the chat room;
   obtaining a message identifier record value from the transmitted link email and associating the message identifier record value with the chat room;
   receiving the unique uniform resource locator from a browser; and
   allowing the browser to access the chat room.

2. The method of claim 1, further comprising receiving a reply email and determining that the reply email was sent by a first participant in the set of participants in the chat room and that the reply email comprises the message identifier record value.

3. The method of claim 2, further comprising obtaining a reply email content from the reply email and adding the reply email content to the chat room as a second chat room message.

4. The method of claim 2, further comprising obtaining a reply email attachment from the reply email and adding the reply email attachment to the chat room as a second chat room message.

5. The method of claim 2, further comprising determining that the reply email comprises an instruction to remove the first participant from the set of participants in the chat room.

6. The method of claim 2, further comprising determining that the reply email comprises an email address not of a participant in the set of participants in the chat room.

7. The method of claim 6, further comprising obtaining an account identifier for the email address, adding the account identifier for the email address to the set of participants in the chat room, creating a second unique uniform resource locator, and associating the second unique uniform resource locator with the chat room.

8. The method of claim 7, further comprising transmitting the second unique uniform resource locator in a second link email to the email address.

9. The method of claim 1, further comprising associating the browser with a participant in the set of participants in the chat room.

10. The method of claim 9, further comprising monitoring a presence in the chat room of each participant and receiving a second chat room message.

11. The method of claim 10, wherein when the presence of a participant is determined to exceed a threshold, identifying that the second chat room message has not been transmitted to the participant whose presence was determined to exceed the threshold, preparing a message digest email comprising the second chat room message, the message identifier record value, and the unique uniform resource locator and transmitting the message digest email to the participant whose presence was determined to exceed the threshold.

12. The method of claim 10, wherein monitoring the presence in the chat room of each participant comprises recording when chat room messages have been transmitted to each participant via a browser access to the chat room or via a message digest email.

13. The method of claim 1, further comprising selecting a timeout period and wherein the unique uniform resource locator further comprises an encoded combination of the timeout period, the chat room identifier, and the account identifier for each recipient sender of the invitation email.

14. The method of claim 13, further comprising determining that the unique uniform resource locator was received from the browser before expiration of the timeout period.

15. A non-transitory computer-readable storage medium having stored thereon instructions including instructions that, when executed by a processor, configure the processor to perform a method comprises the following steps:

receiving an invitation email;

parsing a set of components from the invitation email, which set of components comprises a sender of the invitation email, a set of recipients of the invitation email, an invitation email subject, and an invitation email content;

creating a chat room and obtaining a chat room identifier for the chat room;

populating the chat room with a chat room subject comprising the invitation email subject and a chat room message comprising the invitation email content;

obtaining an account identifier for each participant in a set of participants in the chat room, which set of participants in the chat room comprises a recipient of the invitation email in the set of recipients of the invitation email;

creating a unique uniform resource locator comprising an encoded combination of the chat room identifier and the account identifier for each participant in the set of participants in the chat room;

including the unique uniform resource locator in a link email;

transmitting the link email to the set of participants in the chat room;

obtaining a message identifier record value from the transmitted link email and associating the message identifier record value with the chat room;

receiving the unique uniform resource locator from a browser; and allowing the browser to access the chat room.

16. A computing apparatus including a processor and a memory storing instructions that, when executed by the processor, configure the apparatus to perform a method comprising the following steps:

receiving an invitation email;

parsing a set of components from the invitation email, which set of components comprises a sender of the invitation email, a set of recipients of the invitation email, an invitation email subject, and an invitation email content;

creating a chat room and obtaining a chat room identifier for the chat room;

populating the chat room with a chat room subject comprising the invitation email subject and a chat room message comprising the invitation email content;

obtaining an account identifier for each participant in a set of participants in the chat room, which set of participants in the chat room comprises a recipient of the invitation email in the set of recipients of the invitation email;

creating a unique uniform resource locator comprising an encoded combination of the chat room identifier and the account identifier for each participant in the set of participants in the chat room;

including the unique uniform resource locator in a link email;

transmitting the link email to the set of participants in the chat room;

obtaining a message identifier record value from the transmitted link email and associating the message identifier record value with the chat room;

receiving the unique uniform resource locator from a browser; and allowing the browser to access the chat room.

17. The computing apparatus of claim 16, further comprising receiving a reply email and determining that the reply email was sent by a first participant in the set of participants in the chat room and that the reply email comprises the message identifier record value.

18. The computing apparatus of claim 17, further comprising determining that the reply email comprises an email address not of a participant in the set of participants in the chat room.

19. The computing apparatus of claim 18, further comprising obtaining an account identifier for the email address, adding the account identifier for the email address to the set of participants in the chat room, creating a second unique uniform resource locator, and associating the second unique uniform resource locator with the chat room.

20. The computing apparatus of claim 19, further comprising transmitting the second unique uniform resource locator in a second link email to the email address.

* * * * *